(No Model.) 5 Sheets—Sheet 1.
C. G. YOUNG.
ELECTRIC GENERATOR.

No. 461,862. Patented Oct. 27, 1891.

Witnesses:
D. W. Gardner
Nellie L. Pope.

Inventor:
Charles G. Young.
By his Attorney
Edward P. Thompson (No Model.) 5 Sheets—Sheet 2.

C. G. YOUNG.
ELECTRIC GENERATOR.

No. 461,862. Patented Oct. 27, 1891.

ATTEST:
J. Hurdle
George B. Muldaur

INVENTOR:
Chas. G. Young.
By Edward P. Thompson
Attorney (No Model.) 5 Sheets—Sheet 3.
C. G. YOUNG.
ELECTRIC GENERATOR.

No. 461,862. Patented Oct. 27, 1891.

Witnesses:
D. W. Gardner
Nellie L. Pope.

Inventor:
Charles G. Young
By his Attorney,
Edward P. Thompson

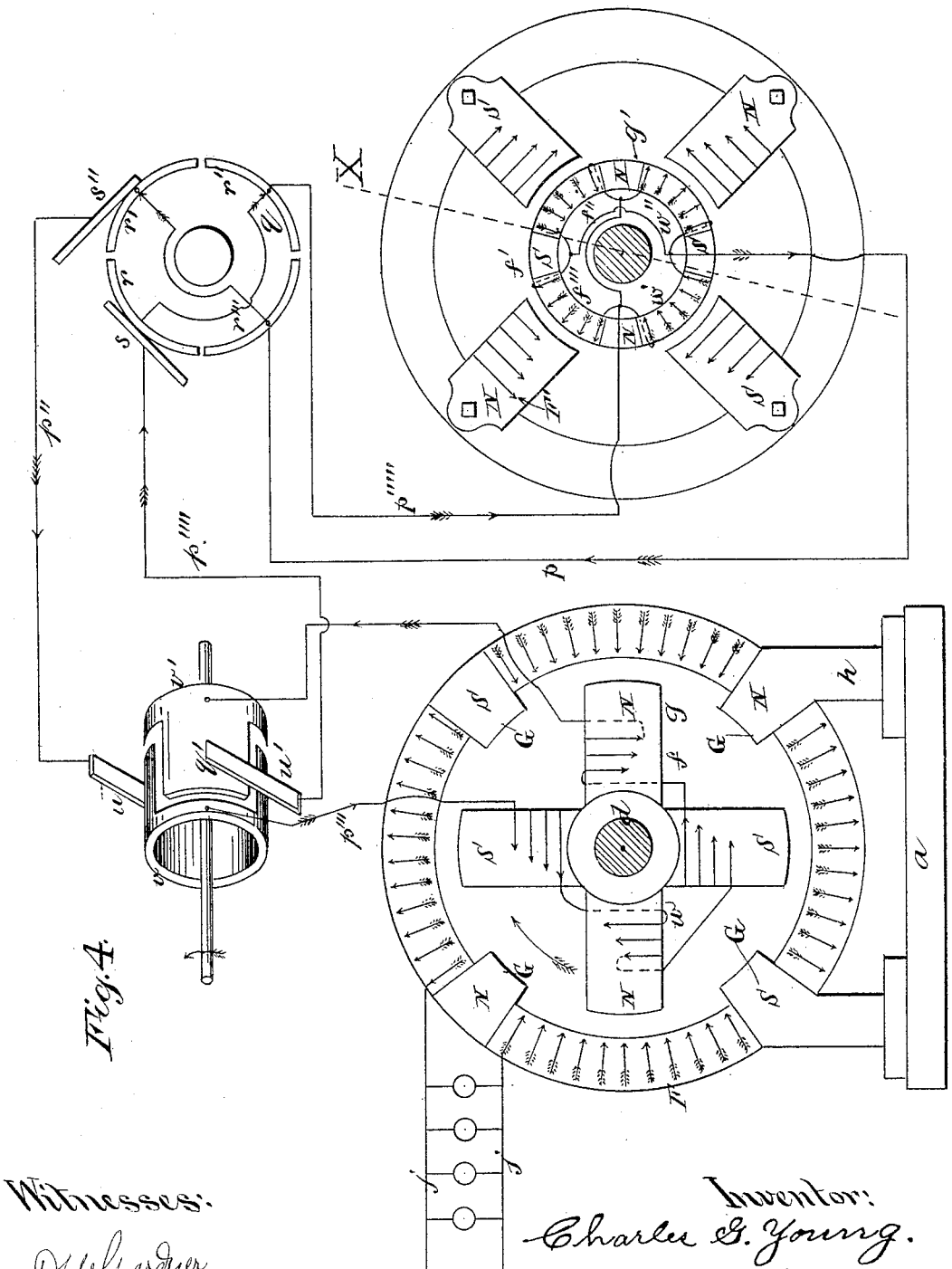

(No Model.)
5 Sheets—Sheet 5.
C. G. YOUNG.
ELECTRIC GENERATOR.
No. 461,862.
Patented Oct. 27, 1891.
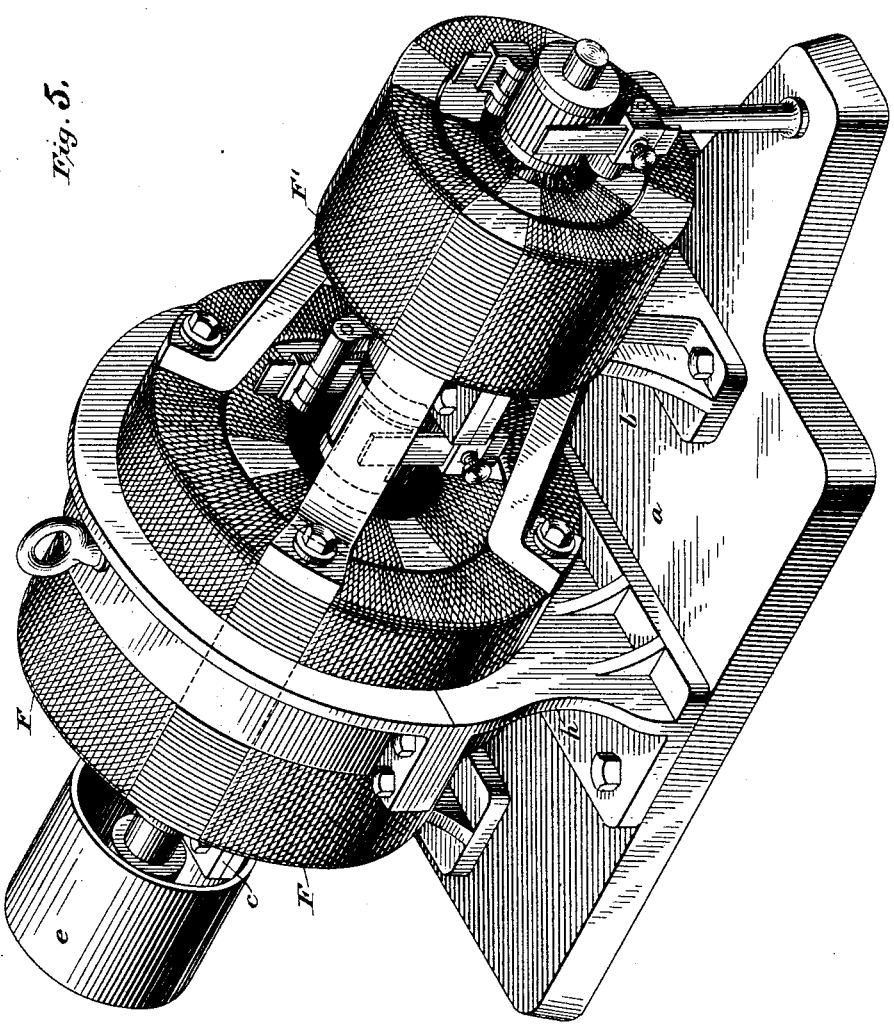

UNITED STATES PATENT OFFICE.

CHARLES GRIFFITH YOUNG, OF NEW YORK, N. Y.

ELECTRIC GENERATOR.

SPECIFICATION forming part of Letters Patent No. 461,862, dated October 27, 1891.

Application filed April 25, 1889. Serial No. 308,563. (No model.)

*To all whom it may concern:*

Be it known that I, CHARLES GRIFFITH YOUNG, a citizen of the United States, and a resident of the city, county, and State of New York, have invented new and useful Improvements in Electric Generators, of which the following is a specification.

My invention relates to an electric-current generator or dynamo; and the object of the invention is to provide an apparatus adapted to generate currents in an economical and simple manner.

By my invention there need be no commutator except on certain types of the exciter.

The construction and operation of the invention and of the modifications are represented in all their details in the accompanying drawings, in which—

Figure 1:
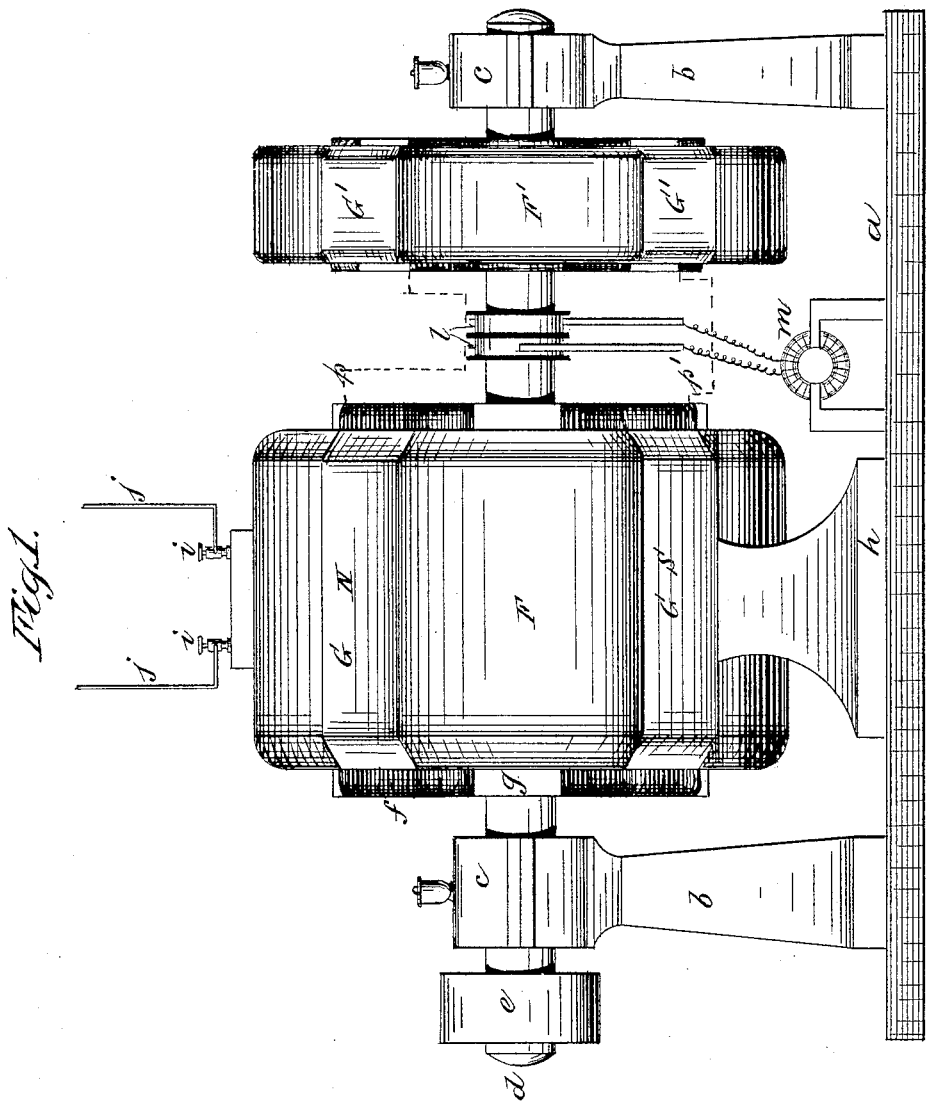
Figure 2:
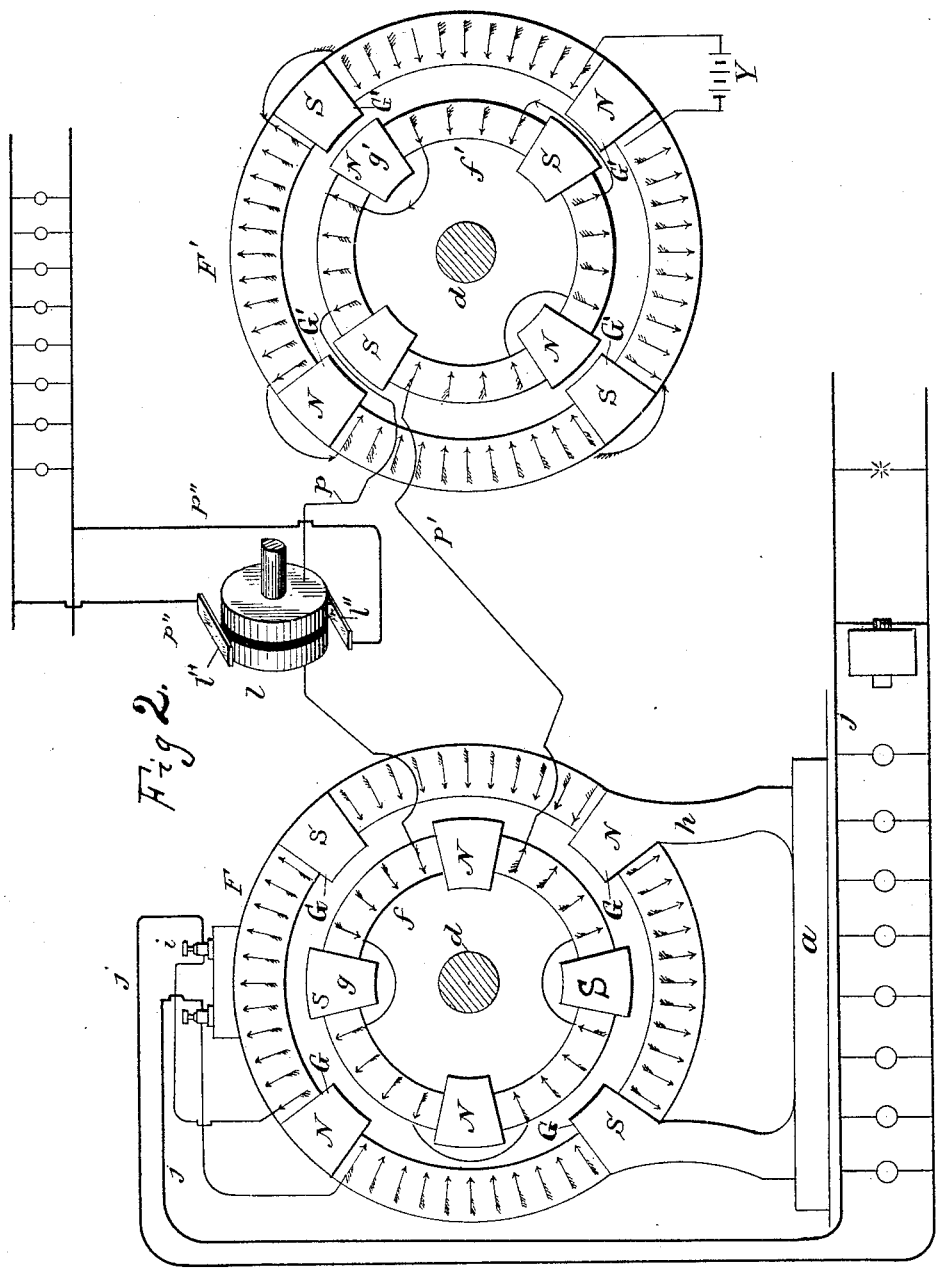
Figure 3:
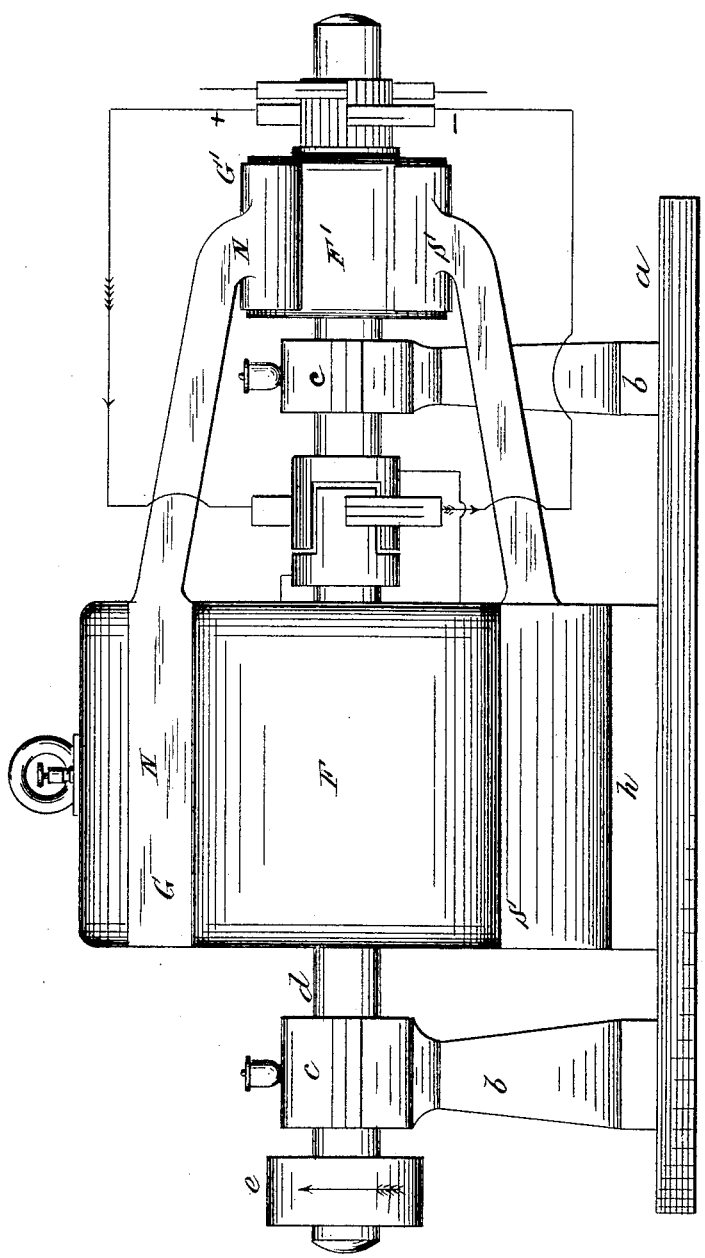

Figure 1 is a side elevation of the dynamo, combined with an electric regulator, the whole mounted upon a suitable base-plate, the dotted lines showing the electrical connections between the two principal parts of the machine. Fig. 2 is a view intended to show the electric circuits (both internal and external) to the dynamo, in order to set forth the manner of generation of currents by the dynamo, while the arrows in said Fig. 2 indicate the direction of flow of the currents during a given position of the two sets of coils of the machine. Fig. 3 is a side elevation of a modified form of dynamo, showing that a direct-current dynamo may be used as the exciter. Fig. 4 is a view similar to Fig. 2 of the circuits and electrical connections of the machine shown in Fig. 3. In all the diagram figures—such as Figs. 2 and 4—the exciter and dynamo proper, or generator, are shown both in the direction of the shaft; but it will be noticed in the remaining figures—such as Figs. 1 and 3—that both the exciter and generator are located upon the same shaft, as a convenient and sure means of obtaining synchronous rotation of the rotary coils of the said exciter and said generator; also in Fig. 4 it may be noticed that the commutators are represented as having no support in connection with the remaining portion of the machine; but this is because the object of the figure is to set forth the electric circuits of the machine. Fig. 5 is a three-sided view of the form of invention represented in Figs. 3 and 4. The regulating-coil is hidden. In Figs. 3 and 5 the exciter is shown as of smaller diameter than shown in the remaining figures, while in all cases the exciter is of smaller width, measured in the direction of the common shaft.

Referring to the drawings, $a$ is the base-plate for supporting the complete machine and constructed of any suitable substance except iron or steel.

$b$ are standards for upholding the shaft, the standards being provided with bearings $c$ for the shaft, which is lettered $d$, and which is a common shaft for the rotary coils of the machine.

$e$ is a driving-pulley mounted and fixed upon the shaft $d$.

$f$ is a set of rotary coils having pole pieces or projections $g$, and mounted and fixed upon the shaft and forming a part of the generator.

$f'$ is a second set of rotary coils having pole pieces or projections $g'$, and also mounted upon and fixed to the said shaft at another point thereon.

F is a set of stationary coils located within inductive relation to the coils $f$ and provided with polar projections or pole-pieces G.

F' is a second set of stationary coils within inductive relation of the coils $f'$ and provided with pole-pieces G'.

$i\ i$ are the terminals of the generator electrically connected to the work-circuit $j$.

$l$ is a pair of rings forming a collector and mounted upon the shaft between the two sets of coils, the members of the pair being insulated from each other, and $m$ is a choking-magnet mounted upon the base $a$ and having its terminals electrically connected to the two rings, respectively.

The set $f'$ of coils in Fig. 4 is indicated as to each coil of the set by $w'$, $w''$, $f''$, and $f'''$.

N are the north poles, and S are the south poles of the several coils. The coils are so wound in each case that in passing around the shaft in imagination the poles are alternately north and south, both in both sets of stationary coils and in the rotary coils. The normal position of the poles of the stationary coils is relatively the same in both sets thereof. These poles lie in lines passing through the shaft at forty-five degrees to a vertical line, considering the base-plate *a* as resting upon a level plane.

In all the figures the generator is at the left of the sheet, while the exciter is at the right. In the generator in each figure the position of the poles *g* of the coils *f* of the rotary set is such that the same are in respectively the vertical and horizontal lines passing through the shaft *d*, while the poles *g'* of the coils of the rotary set *f'* of the exciter have a different relative position to the first-named poles. Both rotary coils *f* and *f'* are fixed upon the shaft *d* at different angles to each other, as clearly shown in Fig. 5. The rotary coils *f* and *f'* are in circuit with each other in such a manner as to give the poles alternately a north and south denomination. In series with the electrical connections is a choking-magnet *m*. (Shown clearly in Fig. 1.) The connection thereto is made by breaking the wire *p* and interposing the collector *l*. In Fig. 2 the wire *p* in circuit with collector *l* is that which connects two of the terminals, respectively, of the two sets of rotary coils. The brushes *l''* of collector *l* are in circuit with the work-circuit *p''* of alternating currents. The wire joining the remaining terminals of said coils is represented by the letter *p'*. The function of the collector in this case is to be able to furnish to the line *p''* a portion of the electrical energy of the exciter to be employed for operating lamps or similar translating devices. Now, passing to Fig. 4, I show how a continuous-current dynamo having a commutator, as usual, may be used as the exciter by having a second commutator for transforming the continuous current into an alternating current.

In Fig. 4 are two commutators *q q'*, arranged in such a manner that the path of the circuit is from one pole of the exciter's rotary coil to the plate *r'''* of the first commutator *q*, then to the brush *s''*, then through the conductor *p''* to the brush *u* upon the plate *v* of the commutator *q'*, then to the conductor *p'''*, then through the rotary coils of the generator, said coils being lettered *f*, then to the plate *v'* of the commutator *q'*, then to the brush *u'*, then through the conductor *p''''*, then to the brush *s*, then to the plate *r''*, then through the conductor *p'''''*, then simultaneously through the coils *w'*, *f'''*, *f''*, and *w''* to the conductor *p*, at the terminal of which the currents join to form a single current. Therefore it may be understood that the exciter is provided with a commutator, which is constructed in the usual manner, to form a continuous-current generator or dynamo. The commutator *q'*, having two plates *v* and *v'*, which are respectively connected to the terminals of the rotary coils *f*, serve to make, through the medium of the current from the exciter, the poles reverse at each quarter of a revolution at the instant the poles of the armature are at the minimum distance from the poles of the field-magnet, the said plates *v* and *v'* each having two projections for reversing the current at each revolution four times. The stationary coils F' of the exciter may be energized in any convenient manner, as by an electric generator Y. (Shown for the sake of illustration in Fig. 2.) As before stated, it is necessary for the poles of the coils of the exciter to be in advance or at a different angle from the similar coils of the generator, this angle to be determined in each case by experiment.

In Fig. 4 before operation the coils *f* should be shifted somewhat to the right, as indicated by position of dotted line X in the exciter without shifting coils F, and then fixed to the shaft.

The function of the choking-magnet *m* is to change the abruptness of the alternations, so as to produce lag of maximum quantity.

The explanation is substantially as follows, as far as the operation is concerned: The field-poles of the exciter are made of constant polarity by means of the electric battery Y. Consequently an alternating current is generated in the coils *f'* of the exciter, and this current is conducted to and from the rotary coils *f* of the generator. As the poles of the coils *f* move toward the poles of the coils F a first current or impulse of one direction is produced in the wires *j*, and when the coils *f* arrive at the points of nearest magnetic approach the coils *f* move away from the coils F and a second current or impulse is generated in wires *j*.

It is difficult to point out the most effective angle which the sets of coils *f* and *f''* would have relatively; but this angle can be approximately determined by adjustment. It may be about forty-five degrees.

I claim as my invention—

A dynamo-electric machine consisting of the combination of two sets of rotary coils mounted and fixed upon a common rotary shaft, two sets of stationary coils placed within inductive relation of said first-named coils, electrical connections between the terminals of the rotary coils, and a choking-magnet included in circuit with the said rotary coils, the said rotary coils being provided with pole-pieces which lie at different angles formed in a circle about the said shaft.

In testimony that I claim the foregoing as my invention I have signed my name hereto, in presence of two witnesses, this 20th day of March, 1889.

CHARLES GRIFFITH YOUNG.

Witnesses:
EDWARD P. THOMPSON,
MICHAEL FENNELLY.